United States Patent
Jiang et al.

(10) Patent No.: US 10,093,858 B2
(45) Date of Patent: Oct. 9, 2018

(54) CHOLESTERIC LIQUID CRYSTAL COMPOSITION, LIQUID CRYSTAL DISPLAY PANEL AND PREPARATION METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Kun Jiang, Beijing (CN); Jian Wang, Beijing (CN); Chunlei Wang, Beijing (CN); Wei Zhao, Beijing (CN); Na Li, Beijing (CN); Xuechao Song, Beijing (CN); Ruichen Zhang, Beijing (CN); Shaowu Ma, Beijing (CN); Lin Han, Beijing (CN); Kangdi Zhou, Beijing (CN); Lanjun Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/540,171

(22) PCT Filed: May 27, 2016

(86) PCT No.: PCT/CN2016/083716
§ 371 (c)(1),
(2) Date: Jun. 27, 2017

(87) PCT Pub. No.: WO2017/148025
PCT Pub. Date: Sep. 8, 2017

(65) Prior Publication Data
US 2018/0044593 A1 Feb. 15, 2018

(30) Foreign Application Priority Data

Mar. 4, 2016 (CN) .......................... 2016 1 0124736

(51) Int. Cl.
| | | |
|---|---|---|
| G02F 1/1333 | (2006.01) | |
| C09K 19/38 | (2006.01) | |
| G02F 1/137 | (2006.01) | |
| C09K 19/42 | (2006.01) | |
| C09K 19/30 | (2006.01) | |

(52) U.S. Cl.
CPC .......... *C09K 19/38* (2013.01); *C09K 19/3066* (2013.01); *C09K 19/42* (2013.01); *G02F 1/13718* (2013.01); *G02F 2201/343* (2013.01)

(58) Field of Classification Search
CPC .... C09K 19/38; C09K 19/42; C09K 19/3066; G02F 1/1333; G02F 1/13718; G02F 2201/343
USPC ....................................... 252/299.01; 428/1.1
See application file for complete search history.

(56) References Cited

U.S. PATENT DOCUMENTS

| | | |
|---|---|---|
| 2005/0145829 A1 | 7/2005 | Leyrer et al. |
| 2007/0090326 A1 | 4/2007 | Bai et al. |
| 2013/0208220 A1 | 8/2013 | Gu et al. |
| 2015/0353828 A1 | 12/2015 | Wang et al. |
| 2016/0068755 A1 | 3/2016 | Beltran Gracia et al. |

FOREIGN PATENT DOCUMENTS

| | | |
|---|---|---|
| CN | 1141645 A | 1/1997 |
| CN | 101281269 | 10/2008 |
| CN | 101296995 A | 10/2008 |
| CN | 102629063 A | 8/2012 |
| CN | 103309073 A | 9/2013 |
| CN | 104046368 A | 9/2014 |
| CN | 104090324 A | 10/2014 |
| CN | 104356375 A | 2/2015 |
| CN | 105121599 A | 12/2015 |
| WO | 9736969 A1 | 10/1997 |

OTHER PUBLICATIONS

The International Search Report and Written Opinion dated Dec. 7, 2016; PCT/CN2016/083716.
The First Chinese Office Action dated Jul. 5, 2017; Appln. No. 201610124736.9.
The Second Chinese Office Action dated Mar. 19, 2018; Appln. No. 201610124736.9.

*Primary Examiner* — Geraldina Visconti
(74) *Attorney, Agent, or Firm* — Ladas & Parry LLP

(57) ABSTRACT

Provided are a cholesteric liquid crystal composition, and a liquid crystal display panel including the composition, and their preparation methods. The cholesteric liquid crystal composition contains a block copolymer and a cholesteric liquid crystal, wherein the block copolymer has a block A including a chiral group $M_1$ and a block B including a chiral group $M_2$, and the cholesteric liquid crystal has at least two different pitches. The display panel includes an array substrate and a counter substrate placed by cell assembly, and a liquid crystal layer disposed between the array substrate and the counter substrate, wherein the liquid crystal layer comprises the cholesteric liquid crystal composition. The liquid crystal layer in the planar texture is capable of reflecting light of at least two wavelengths in the visible light region.

15 Claims, 3 Drawing Sheets

Planar Texture        Focal Conic Texture

Bragg equation: $\lambda = n*p$ the yellow-on-black character (a low contrast)    the red-on-black character (a low contrast)

CHOLESTERIC LIQUID CRYSTAL COMPOSITION, LIQUID CRYSTAL DISPLAY PANEL AND PREPARATION METHOD THEREOF

TECHNICAL FIELD

Embodiments of the present invention relate to a cholesteric liquid crystal composition and a liquid crystal display panel containing the cholesteric liquid crystal composition, and preparation methods thereof.

BACKGROUND

With continuous improvements of the liquid crystal display technology in recent years, liquid crystal display products have gradually entered into a variety of applications. LCD display has advantages such as a low energy consumption, applicability in a tablet, a light and thin structure, a highly efficient display, energy saving, and environmental friendliness, and thus occupies a very important position in the display area.

Due to continuous improvements of the liquid crystal display technology, a new display technology, cholesteric liquid crystal (CLC) display technology being light and thin, and low-power and portable has been proposed. A cholesteric liquid crystal display, for example a bistable liquid crystal display, is a display mode which uses two stable states (i.e., a focal conic texture and a planar texture) of a cholesteric liquid crystal. The cholesteric liquid crystal in the focal conic texture and the planar texture can continue to maintain the above two states without an external electric field, so that the need for drive by an external electric field is eliminated for the display. Driven by an external electric field, the two states can be mutually converted to provide an effective display. The cholesteric liquid crystal display has advantages such as a high brightness, a wide viewing angle, and low power consumption, and can be displayed on a flexible substrate. The cholesteric liquid crystal display is of a reflective type, which can eliminate a backlight and reduce the power consumption and size of the electronic display device. The reflective cholesteric liquid crystal display can be widely used in the occasions that need to display without frequent refreshing, such as e-books, electronic curtains, price cards and outdoor advertising.

SUMMARY

Embodiments of the present invention provide a cholesteric liquid crystal composition comprising a block copolymer and a cholesteric liquid crystal, wherein the block copolymer comprises a block A containing a chiral group $M_1$ and a block B containing a chiral group $M_2$; and the cholesteric liquid crystal has at least two different pitches.

In some embodiments, the optical rotation of the block A is different from the optical rotation of the block B. When the block copolymer is mixed with a liquid crystal molecule, a cholesteric liquid crystal having at least two pitches can be formed. The formed cholesteric liquid crystal can reflect at least two kinds of visible light. Here, the difference between the optical rotation of the block A and that of the block B can be achieved by making the chiral group $M_1$ different from the chiral group $M_2$, and/or making the content of the chiral group $M_1$ in the block A different from the content of the chiral group $M_2$ in the block B.

Embodiment of the present invention further provide a display panel including an array substrate and a counter substrate placed by cell assembly and a liquid crystal layer disposed between the array substrate and the counter substrate, wherein the liquid crystal layer comprises the above cholesteric liquid crystal composition.

In some embodiments of the display panel, the array substrate has a plurality of pixel regions; the cholesteric liquid crystal composition is evenly distributed in each pixel region and is capable of reflecting light of at least two wavelengths in the visible light region.

In the display panel, different pitches of a cholesteric liquid crystal can be locally obtained by doping a bistable liquid crystal with a block copolymer having different chiral agents, so that the liquid crystal layer in the planar texture can reflect visible light of different wavelengths to achieve display with high brightness and high contrast, such as black and white display.

Embodiments of the present invention also provide a method for preparing the cholesteric liquid crystal composition which comprises providing the block copolymer; and mixing the block copolymer with an initial liquid crystal molecule to form the cholesteric liquid crystal composition. In some embodiments, the block copolymer is dissolved in the initial liquid crystal molecule such that the block copolymer is evenly distributed in the cholesteric liquid crystal composition.

In embodiments of the method for preparing the cholesteric liquid crystal composition, the block A and the block B in the block copolymer may be sequentially formed (e.g., the block A of the block copolymer is formed first, followed by the block B; or the block B of the block copolymer is formed first, followed by the block A); or a polymer A containing the block A and a polymer B containing the block B are formed respectively, and then the polymer A and the polymer B are connected together to form the block copolymer.

The embodiment of the present invention further provides a method for manufacturing the above-described display panel, comprising: providing an array substrate and a counter substrate, and forming the above-described cholesteric liquid crystal composition as a liquid crystal layer located between the array substrate and the counter substrate.

The liquid crystal layer formed from the cholesteric liquid crystal composition may also be formed in situ in the display panel. Thus, embodiments of the present invention also provide a method of preparing the above-described display panel which comprises: providing a polymer A having a block A and a polymer B having a block B; mixing (e.g., dissolving) the polymer A and the polymer B with an initial liquid crystal molecule to obtain an initial liquid crystal composition; disposing the initial liquid crystal composition, for example by infusion or dripping, between the array substrate and the counter substrate placed by cell assembly; and connecting the polymer A and the polymer B in the initial liquid crystal composition to form the block copolymer, thereby forming the cholesteric liquid crystal composition.

BRIEF DESCRIPTION OF THE DRAWINGS

In order to clearly illustrate the technical solutions of the embodiments of the present disclosure, the drawings of the embodiments will be briefly described in the following. It is apparent that the described drawings are only related to some embodiments of the present disclosure and thus are not intended to limit the invention.

DETAILED DESCRIPTION

In order to make objects, technical details and advantages of the embodiments of the present disclosure apparent, the technical solutions of the embodiments will be described in a clearly and fully understandable manner in connection with the drawings. It is obvious that the described embodiments are just a part of but not all of the embodiments of the present disclosure. Based on the described embodiments herein, those skilled in the art can, without any inventive work, obtain other embodiments, which should be within the protection scope of the present invention.

Figure 1:
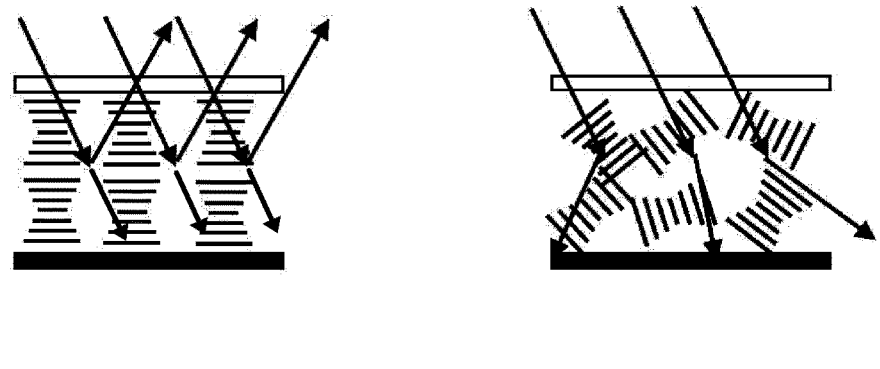
FIG. 1 shows the principle of a bistable liquid crystal display.

FIG. 1 shows the principle of a bistable liquid crystal display, in which the left side of FIG. 1 illustrates the reflection of a display area, and the right side of FIG. 1 illustrates the transmission of a non-display area.

The left side of FIG. 1 shows the principle that the cholesteric liquid crystal in the planar texture reflects light of a particular wavelength. Since the pitch of the cholesteric liquid crystal in FIG. 1 is fixed, according to the Bragg's reflection law, the cholesteric liquid crystal in the planar texture can only reflect light of a certain wavelength, and light of other wavelengths penetrates the liquid crystal layer, so that monochromatic light of a specific wavelength is displayed. The right side of FIG. 1 shows that the cholesteric liquid crystal in the focal conic texture transmits all the incident light and thus black is displayed.

In general, the cholesteric liquid crystal has a pitch of about 300 to 400 nm, for example, about 300 nm, and a refractive index of about 1 to 2, for example, 1.60, so that the cholesteric liquid crystal can reflect light at a wavelength of about 300 to 800 nm. In a practical embodiment, the reflection wavelength may be about 380 to 780 nm, just covering the wavelength of the visible light. However, since the cholesteric liquid crystal has a characteristic of a selective reflection, a cholesteric liquid crystal with a single pitch reflects only light of a single wavelength, and thus a single color is displayed.

Figure 2:
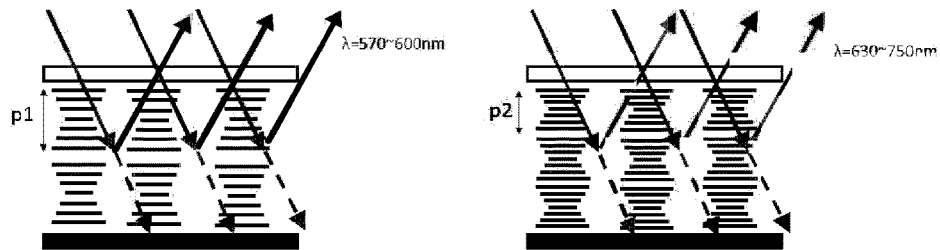
FIG. 2 shows a schematic view of two bistable liquid crystal displays.

FIG. 2 shows the principle of a bistable liquid crystal display of the yellow-on-black character (left) and the red-on-black character (right).

The bistable liquid crystal display shown in FIGS. 1 and 2 is achieved by incorporating a chiral agent with a low molecular weight or a polymer having a single optical rotation into the liquid crystal to form a cholesteric liquid crystal having a fixed pitch. This cholesteric liquid crystal has two stable states. The planar texture can reflect the incident light at a fixed wavelength, and the wavelength of the reflected light conforms to the Bragg equation $\lambda = n \ast p$ (where $\lambda$ is the wavelength of the reflected light and p is the pitch of the cholesteric liquid crystal). The pitch is determined by the amount and structure of the chiral carbon in the chiral agent incorporated. The focal conic texture has a chaotic structure, and the incident light can penetrate the liquid crystal and be absorbed by the background, thereby black is displayed. Since the chiral agent with a low molecular weight or the polymer having a single optical rotation is very evenly distributed in the liquid crystal, the whole cholesteric liquid crystal has a fixed pitch, so that the liquid crystal in the planar texture can only reflect a monochromatic light at a fixed wavelength, and light of other wavelengths is absorbed by the background. As such, the reflection efficiency is low and only a certain color can be displayed, so that the display effect is limited and the application of the bistable liquid crystal display is greatly limited. As shown in FIG. 2, the left display panel can only reflect light from 570 to 600 nm, thus displaying the yellow-on-black character, whereas the right display panel can only reflect light from 630 to 750 nm, thus displaying the red-on-black character. Their display contrast is low, and the display effect is poor.

Embodiments of the present invention provide a cholesteric liquid crystal composition comprising a block copolymer and a cholesteric liquid crystal, wherein the block copolymer comprises a block A containing a chiral group $M_1$ and a block B containing a chiral group $M_2$, and the cholesteric liquid crystal has at least two different pitches.

In some embodiments of the cholesteric liquid crystal composition, the block A comprises a repeating unit of the following formula (I):

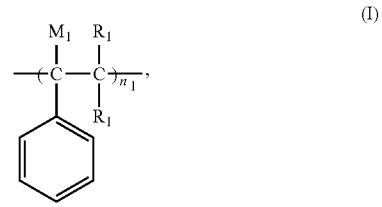

(I)

wherein $R_1$ is each independently selected from hydrogen, $C_{1-20}$ alkyl and the like, and $n_1$ is an integer indicating the number of repeating units.

In some embodiments, the block B comprises a repeating unit of the following formula (II):

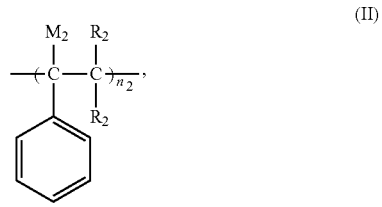

(II)

wherein $R_2$ is each independently selected from hydrogen, $C_{1-20}$ alkyl and the like, and $n_2$ is an integer indicating the number of repeating units.

The term $C_{1-20}$alkyl herein represents an alkyl group having 1 to 20 carbon atoms, which may comprise $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, $C_{18}$ alkyl, $C_{19}$ alkyl, and $C_{20}$ alkyl. The integer $n_1$ or $n_2$ may be 10 to 100000, for example 100 to 10000, for example 500 to 5000. It should be noted that $n_1$ or $n_2$ represents the number of occurrences of the repeating unit of the formula (I) or the formula (II) in the block A or the block B. However, $n_1$ or $n_2$ does not indicate that there is no other repeating unit between two adjacent repeating units of the formula (I) or the formula (II). That is to say, there may be other repeating units between two adjacent repeating units of the formula (I) or the formula (II).

In some embodiments, the content of the chiral group $M_1$ in the block A is from 5 to 100 mol %, preferably from 5 mol % to 30 mol %. The content is not particularly limited, for example, may be 8 mol %, 10 mol %, 12 mol %, 15 mol %, 18 mol %, 20 mol %, 22 mol %, 25 mol %, 28 mol %, 30 mol %, 40 mol %, 50 mol %, 60 mol %, 70 mol %, 80 mol %, and the like. Here, mol % refers to the number of moles of repeating units with the chiral group $M_1$ in the block A divided by the total number of moles of repeating units in the block A. In general, the content of the chiral group $M_1$ in the block A depends on the proportion of the monomer containing the chiral group $M_1$ in the monomer raw materials forming the block A, and for example, is consistent with the proportion of monomers containing the chiral group $M_1$.

In some embodiments, the content of the chiral group $M_2$ in the block B is from 5 to 100 mol %, preferably from 5 mol % to 30 mol %. The content is not particularly limited, for example, 8 mol %, 10 mol %, 12 mol %, 15 mol %, 18 mol %, 20 mol %, 22 mol %, 25 mol %, 28 mol %, 30 mol %, 40 mol %, 50 mol %, 60 mol %, 70 mol %, 80 mol %, and the like. Here, mol % refers to the number of moles of repeating units with the chiral group $M_2$ in the block B divided by the total number of moles of repeating units in the block B. In general, the content of the chiral group $M_2$ in the block B depends on the proportion of the monomer containing the chiral group $M_2$ in the monomer raw materials forming the block B, and for example, is consistent with the proportion of monomers containing the chiral group $M_2$.

In some embodiments, the chiral group $M_1$ is different from the chiral group $M_2$; in other embodiments, the chiral group $M_1$ is the same as the chiral group $M_2$.

In some embodiments, the content of the chiral group $M_1$ in the block A is the same as or different from the content of the chiral group $M_2$ in the block B.

In some embodiments, the optical rotation of the block A is different from the optical rotation of the block B. Difference between the optical rotation of the block A and that of the block B can be achieved by making the chiral group $M_1$ different from the chiral group $M_2$, and/or making the content of the chiral group $M_1$ in the block A different from the content of the chiral group $M_2$ in the block B. That is to say, the optical rotation of the block A can be made different from the optical rotation of the block B by selecting at least one of the type and content of the chiral group $M_1$ and the chiral group $M_2$.

In some embodiments, the molecular weight of the block copolymer is from 1000 to 300000 daltons. The molecular weight of the block copolymer is not particularly limited as long as it can be dissolved in a liquid crystal molecule used subsequently. In general, the molecular weight within this range may be 3000, 5000, 8000, 10000, 12000, 15000, 18000, 20000, 25000 daltons, and the like.

In some embodiments, the chiral group $M_1$ and the chiral group $M_2$ are each independently selected from:

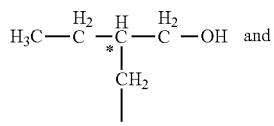

and

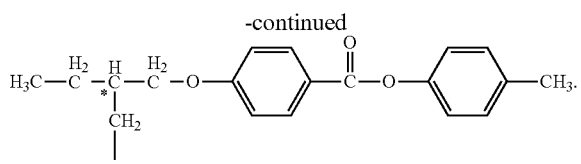

Embodiments of the present invention also provide a display panel comprising an array substrate and a counter substrate placed by cell assembly and a liquid crystal layer disposed between the array substrate and the counter substrate, wherein the liquid crystal layer comprises the cholesteric liquid crystal composition as described above.

The array substrate in embodiments of the present invention may include a plurality of gate lines and a plurality of data lines. These gate lines and data lines cross each other thereby defining the pixel units arranged in a matrix. Each pixel unit includes a thin film transistor as a switching element and a pixel electrode and a common electrode for applying an electric field. For example, the gate of the thin film transistor of each pixel is electrically connected or integrally formed with the corresponding gate line; the source is electrically connected or integrally formed with the corresponding data line; and the drain is electrically connected or integrally formed with the corresponding pixel electrode. The array substrate and the counter substrate are placed opposite to each other to form a liquid crystal cell, and the liquid crystal cell is filled with a liquid crystal material.

The display panel of the present invention may be of a reflective type. In order to display black in a non-display area, a background composed of a light-absorbing material such as a black material may be formed on the non-display side. For example, a background composed of a light-absorbing material such as a black material is formed on the side of the array substrate or the counter substrate facing the liquid crystal layer.

In some embodiments of the display panel, the array substrate has a plurality of pixel regions. The cholesteric liquid crystal composition is evenly distributed in each pixel region and is capable of reflecting light of at least two wavelengths in the visible light region.

In some embodiments of the display panel, the block copolymer is evenly distributed in the liquid crystal layer. The block copolymer evenly distributed in the liquid crystal layer allows the cholesteric liquid crystal to have at least two pitches evenly so that the liquid crystal layer in a planar texture can uniformly reflect visible light having at least two colors, thereby increasing the brightness and contrast of the display panel. In these embodiments, the cholesteric liquid crystal having at least two pitches and the block copolymer are evenly distributed in each pixel region of the liquid crystal layer. It should be noted that the reflected light having at least two colors can show a combined color, such as white, for the human eye. In some embodiments, the difference in wavelength between two colors is greater than 50 nm, for example greater than 100 nm, or greater than 120 nm. For example, if the reflected light having at least two colors is light having two complementary colors, such as blue (or blue violet) and yellow, or cyan and orange, the human eye sees white (or almost white). If the reflected light having at least two colors includes red light, green light and blue light, then the human eye would see white light. If the spectrum of the reflected light can cover the entire visible area, then the human eye would also see white light.

In some embodiments, the array substrate has a plurality of pixel regions. The cholesteric liquid crystal composition is evenly distributed in each pixel region and comprises a cholesteric liquid crystal having at least three pitches that is capable of reflecting light of at least three wavelengths in the visible light region. Compared with the case of reflecting light of two wavelengths, the reflected light is visually closer to white in the case of reflecting light of at least three wavelengths, and the brightness and contrast can be further improved.

Figure 3:
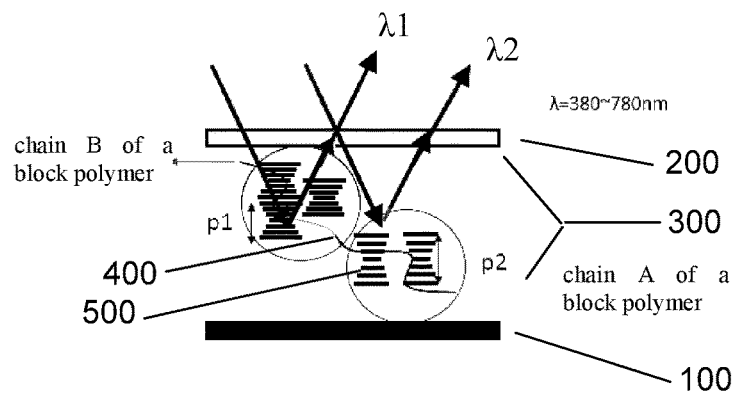
FIG. 3 shows a schematic representation of a display panel containing a cholesteric liquid crystal composition and its display principle.

FIG. 3 shows the display principle of a display panel comprising the cholesteric liquid crystal composition by taking a pixel region as an example. In FIG. 3, the display panel includes an array substrate 100 and a counter substrate 200 placed by cell assembly, and further includes a liquid crystal layer 300 disposed between the array substrate 100 and the counter substrate 200. The liquid crystal layer 300 comprises a block copolymer 400 having a block A and a block B and a cholesteric liquid crystal 500. In the display panel shown in FIG. 3, the block copolymer 400 has a block A and a block B, corresponding to which a cholesteric liquid crystal with a pitch p1 and a cholesteric liquid crystal with a pitch p2 are formed. Therefore, the cholesteric liquid crystal composition comprises a block copolymer 400 having blocks A and B and a cholesteric liquid crystal having pitches p1 and p2. The cholesteric liquid crystal with the pitch p1 in the planar texture can reflect light of the wavelength $\lambda 1=n*p1$, and the cholesteric liquid crystal with the pitch p2 in the planar texture can reflect light of the wavelength $\lambda 2=n*p2$, wherein n is the refractive index of the cholesteric liquid crystal composition in the planar texture (i.e., the reflective state).

As shown in FIG. 3, into the liquid crystal phase a block copolymer is introduced, in which different blocks have different optical rotations (which is achieved by introducing different amounts and/or different types of chiral carbon atoms in different blocks). By dissolving the block copolymer in the liquid crystal, different pitches can be obtained in micro-regions of the liquid crystal (e.g., various pitch is obtained in a region corresponding to one sub-pixel). As such, visible light of different wavelengths can be reflected, thereby greatly improving the utilization of ambient light and achieving bistable display with high contrast and high brightness, for example black and white display. In this application, introducing the block copolymer as described above into the liquid crystal causes the pitch of the local liquid crystal to change so that the liquid crystal can reflect light of different wavelengths and can display a white color with high contrast by combining the reflected light. It should be noted that, in FIG. 3, the array substrate 100 is also used as the background of the display panel, and thus a background made of a light-absorbing material such as a black material is formed on the side of the array substrate 100 facing the liquid crystal layer.

Embodiments of the present invention also provide a method for preparing the cholesteric liquid crystal composition described above, comprising the steps of: providing the block copolymer and mixing (e.g., dissolving) the block copolymer with an initial liquid crystal molecule.

In the method for preparing the cholesteric liquid crystal composition described above, the block A and the block B in the block copolymer may be sequentially formed to provide the block copolymer. Alternatively, a polymer A containing the block A and a polymer B containing the block B are formed respectively, and then the polymer A and the polymer B are connected together to form the block copolymer.

In the method for preparing the cholesteric liquid crystal composition described above, the block A may be formed by grafting a graft monomer A containing a chiral group $M_1$ onto a polymer, or using a polymerizable monomer A containing a chiral group $M_1$.

In the method for preparing the cholesteric liquid crystal composition described above, the block B may be formed by grafting a graft monomer B containing a chiral group $M_2$ onto a polymer, or using a polymerizable monomer B containing a chiral group $M_2$.

Embodiments of the present invention also provide a method for preparing the block copolymer having blocks A and B, which comprises: forming a polymer A containing the block A, forming a polymer B containing the block B, and then forming a bond between the polymer A containing the block A and the polymer B containing the block B to obtain the block copolymer.

Figure 4:
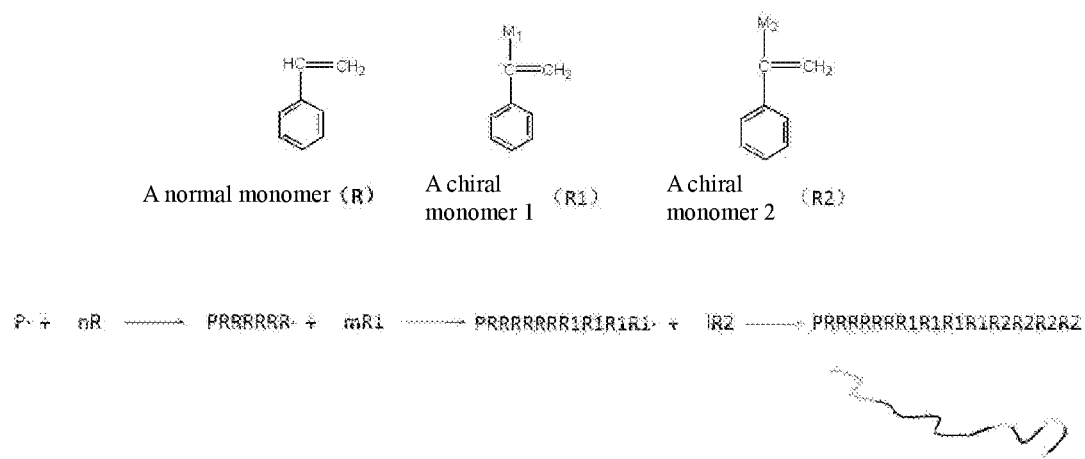
FIG. 4 shows a scheme for forming a block copolymer provided in an embodiment of the present invention.

FIG. 4 shows a scheme for preparing the above block copolymer. As shown in FIG. 4, the block copolymer is obtained by anionic polymerization of polymerizable monomers having a chiral group. The optical rotation of different blocks is determined by controlling the proportion and structure of the polymerized monomers having a chiral group. The synthesized block copolymer is then dissolved in a liquid crystal to form a cholesteric liquid crystal having different pitches so as to obtain the cholesteric liquid crystal composition.

Therefore, embodiments of the present invention also provide a method for preparing a display panel, which comprises providing an array substrate and a counter substrate, and forming a liquid crystal layer between the array substrate and the counter substrate by using the cholesteric liquid crystal composition described above.

Figure 5:
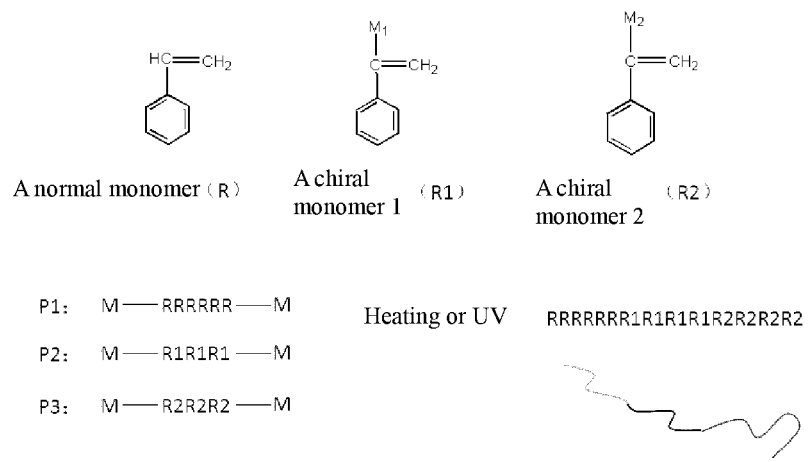
FIG. 5 shows a scheme for forming a block copolymer provided in another embodiment of the present invention.

FIG. 5 shows a scheme for preparing the above block copolymer. As shown in FIG. 5, oligomers containing different amounts and structures of chiral carbon atoms are synthesized using polymerizable monomers with a chiral group. A copolymerizable functional group M (e.g., an epoxy group, a photosensitive group, etc.) is leaved in the end groups of the oligomers. The oligomers are dissolved in an initial liquid crystal molecule and infused into a liquid crystal cell. Then, the block copolymer is formed by thermal initiation or photoinitiation, thereby obtaining the cholesteric liquid crystal composition (or liquid crystal layer) in situ in the liquid crystal cell.

The embodiment of the present invention also provides a method for preparing the above-described display panel, which comprises: providing a polymer A having a block A and a polymer B having a block B; mixing (e.g., dissolving) the polymer A and the polymer B with an initial liquid crystal molecule to obtain an initial liquid crystal composition; disposing the initial liquid crystal composition between an array substrate and a counter substrate placed by cell assembly; and connecting the polymer A and the polymer B in the initial liquid crystal composition to form the block copolymer, thereby forming the cholesteric liquid crystal composition.

In some embodiments, the initial liquid crystal molecule comprises a nematic liquid crystal molecule.

Example 1

The following materials were used in this example (the starting materials used in the present application were commercially available or can be prepared by conventional methods):

Initiator: Butyl Lithium (P);

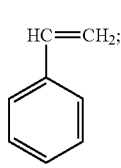
(R1)

Monomer 1:

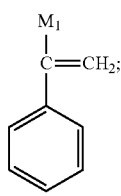
(R2)

Monomer 2:

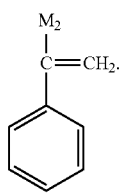
(R3)

Monomer 3:

Step 1: constructing an anionic active polymerization system wherein a molar ratio of P:R1 was 1:10, and initiating a polymerization reaction by heating;

Step 2: After reacting for 3 to 5 hours (the monomers were basically consumed), adding a mixture 1 of the monomer 1 and the monomer 2, wherein the amount of the mixture 1 was equal to the amount of R1 in step 1 in moles; and a molar ratio of R1:R2 in the mixture 1 was 10:1;

Step 3: After reacting for 3 to 5 hours (the monomers were basically consumed), adding a mixture 2 of the monomer 1 and the monomer 3, wherein the amount of the mixture 2 was equal to the amount of monomer 1 in step 1 in moles; and a molar ratio of R1:R3 in the mixture 2 was 10:1;

Step 4: After reacting for 3 to 5 hours (the monomers were basically consumed), terminating the reaction by adding a terminator.

FIG. 4 illustrates the reaction process giving a polymer as shown.

In this example, the chiral group $M_1$ was

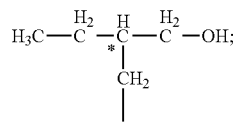

and the chiral group $M_2$ was

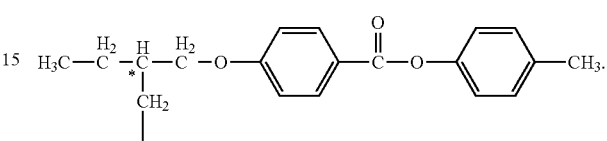

Example 2

The polymer obtained from Example 1 was added to a nematic liquid crystal stock (refractive index n=1.43, model: BHR-93500 liquid crystal, purchased from Beijing Bayishikong, Inc.) and mixed by heating and centrifugal shocking to obtain a cholesteric liquid crystal composition 1.

Comparative Example

A small molecular photoactive chiral dopant:

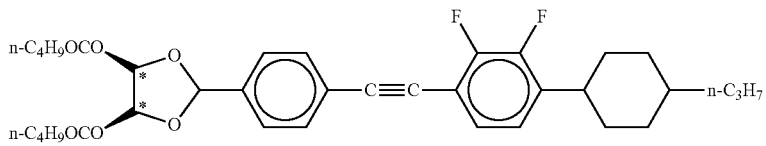

was added into a nematic liquid crystal stock (refractive index n=1.43, model: BHR-93500 liquid crystal, purchased from Beijing Bayishikong, Inc.), and mixed by heating and centrifugal shocking to obtain a cholesteric liquid crystal composition 2.

Example 3

By injection, the cholesteric liquid crystal composition obtained from Example 2 or Comparative Example was infused between an array substrate and a counter substrate placed by cell assembly to form bistable liquid crystal display panel 1 or 2. The data of the reflection spectrum and brightness were obtained by testing under an ambient light of 600 nit (see Table 1 below and FIG. 6).

TABLE 1

| | bistable liquid crystal display panel 1 | bistable liquid crystal display panel 2 |
|---|---|---|
| cholesteric liquid crystal composition brightness | cholesteric liquid crystal composition 1 150 nit | cholesteric liquid crystal composition 2 50 nit |

TABLE 1-continued

|  | bistable liquid crystal display panel 1 | bistable liquid crystal display panel 2 |
|---|---|---|
| spectrum | about 450 nm and about 570 nm | about 450 nm |

Figure 6:
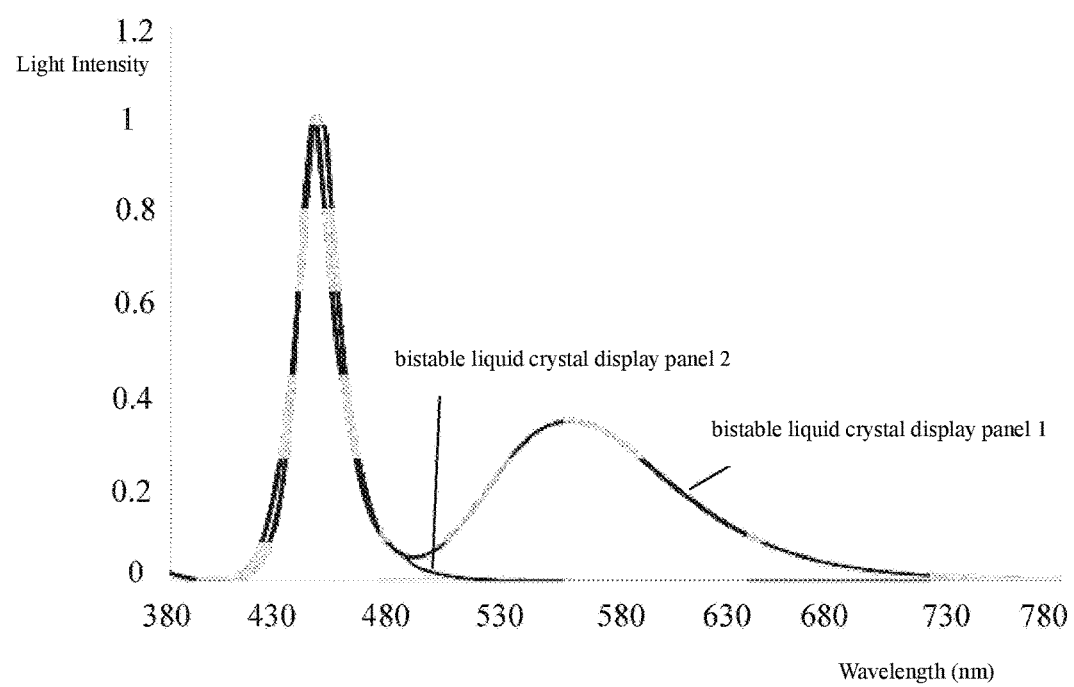
FIG. 6 shows a comparison between the reflectance spectrum of a display panel comprising a cholesteric liquid crystal having at least two pitches and that of a display panel comprising a cholesteric liquid crystal having only one pitch.

As shown by FIG. 6 and Table 1, the bistable liquid crystal display panel 2 only reflected blue light of about 450 nm, thereby displaying a blue color. In contrast, the light reflected by the bistable liquid crystal display panel 1 included yellow light of about 570 nm and blue light of about 450 nm, and white light was visually observed. Moreover, the bistable liquid crystal display panel 1 displayed a higher brightness and thus a higher contrast, compared with the bistable liquid crystal display panel 2.

Example 4

In this example, firstly, a copolymer was synthesized with the same starting materials as in the Example 1, except that the following steps were used to obtain a block copolymer having three blocks of different optical rotations:

Step 1: constructing an anionic active polymerization system wherein a molar ratio of P:R1 was 1:10, and initiating a polymerization reaction by heating;

Step 2: After reacting for 3 to 5 hours (the monomers were basically consumed), gradually adding a mixture 3 of the monomer 1, the monomer 2 and the monomer 3 under reaction conditions, wherein the ratio of monomers in the mixture 3 was changed from R1:R2:R3=10:1:0 (a molar ratio) to R1:R2:R3=10:0.5:0.5 (a molar ratio), then to R1:R2:R3=10:0:1 (a molar ratio) over 6-10 hours;

Step 3: terminating the reaction by adding a terminator to obtain a block copolymer having three blocks of different optical rotations.

The obtained block copolymer having three blocks of different optical rotations was added to a nematic liquid crystal stock (refractive index n=1.43, model: BHR-93500 liquid crystal, purchased from Beijing Bayishikong, Inc.) and mixed by heating and centrifugal shocking to obtain a cholesteric liquid crystal composition 3.

By injection, the obtained cholesteric liquid crystal composition 3 was infused between an array substrate and a counter substrate placed by cell assembly to form a bistable liquid crystal display panel 3. The data of the reflection spectrum and brightness were obtained by testing under an ambient light of 600 nit (see Table 2 below).

TABLE 2

|  | bistable liquid crystal display panel 3 |
|---|---|
| cholesteric liquid crystal composition | cholesteric liquid crystal composition 3 |
| brightness | 210 nit |
| spectrum | about 450 nm, about 520 nm, about 570 nm |

As shown in Table 2, the light reflected by the bistable liquid crystal display panel 3 included yellow light of about 570 nm, green light of 520 nm and blue light of about 450 nm, and white light was visually observed. The bistable liquid crystal display panel 3 displayed a higher brightness and thus a higher contrast, compared with the bistable liquid crystal display panel 1.

The foregoing is merely illustrative of the present invention and is not intended to limit the scope of the invention. The scope of the invention is defined by the appended claims.

The present application claims the priority of the Chinese Patent Application 201610124736.9 filed on Mar. 4, 2016, which is hereby incorporated by reference in its entirety as part of this application.

What is claimed is:

1. A cholesteric liquid crystal composition comprising a block copolymer and a cholesteric liquid crystal, wherein:

the block copolymer comprises a block A containing a chiral group $M_1$ and a block B containing a chiral group $M_2$;

the cholesteric liquid crystal has at least two different pitches;

the block A comprises a repeating unit of a formula (I):

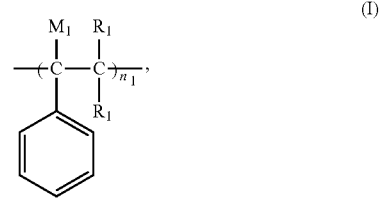

wherein $R_1$ is independently selected from hydrogen and $C_{1-20}$ alkyl; and $n_1$ is an integer indicating the number of repeating units;

the block B comprises a repeating unit of a formula (II):

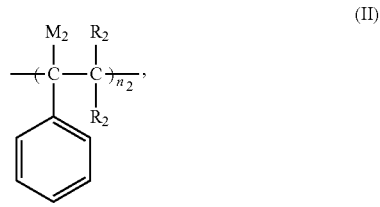

wherein $R_2$ is independently selected from hydrogen and $C_{1-20}$ alkyl; and $n_2$ is an integer indicating the number of repeating units; and the chiral group $M_1$ and the chiral group $M_2$ are each independently selected from the group consisting of:

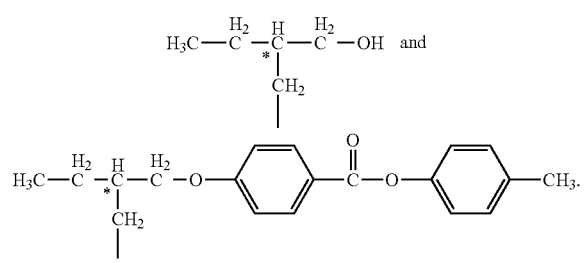

2. The cholesteric liquid crystal composition of claim 1, wherein the optical rotation of the block A is different from that of the block B.

3. The cholesteric liquid crystal composition of claim 1, wherein the content of the chiral group $M_1$ in the block A is from 5 to 100 mol %.

4. The cholesteric liquid crystal composition of claim 1, wherein the content of the chiral group $M_2$ in the block B is from 5 to 100 mol %.

5. The cholesteric liquid crystal composition of claim 1, wherein the chiral group $M_1$ is different from the chiral group $M_2$.

6. The cholesteric liquid crystal composition of claim 1, wherein the content of the chiral group $M_1$ in the block A and the content of the chiral group $M_2$ in the block B are the same or different.

7. The cholesteric liquid crystal composition of claim 1, wherein the molecular weight of the block copolymer is from about 1000 daltons to about 300,000 daltons.

8. A display panel, comprising
an array substrate and a counter substrate placed by cell assembly, and
a liquid crystal layer disposed between the array substrate and the counter substrate,
wherein the liquid crystal layer comprises the cholesteric liquid crystal composition according to claim 1.

9. The display panel of claim 8, wherein
the array substrate has a plurality of pixel regions;
the cholesteric liquid crystal composition is evenly distributed in each pixel region and is capable of reflecting light of at least two wavelengths in the visible light region.

10. A method for preparing the cholesteric liquid crystal composition of claim 1, comprising:
providing the block copolymer; and
mixing the block copolymer with an initial liquid crystal molecule.

11. The method of claim 10, wherein the block copolymer is provided by
forming the block A and the block B in the block copolymer sequentially; or
forming a polymer A containing the block A and a polymer B containing the block B respectively, and then connecting the polymer A with the polymer B.

12. The method of claim 10, wherein the initial liquid crystal molecule comprises a nematic liquid crystal molecule.

13. A method for preparing a display panel, comprising:
providing an array substrate and a counter substrate,
forming a liquid crystal layer between the array substrate and the counter substrate by using the cholesteric liquid crystal composition of claim 1.

14. A method for manufacturing the display panel of claim 8, comprising:
providing a polymer A having the block A and a polymer B having the block B,
mixing the polymer A and the polymer B with an initial liquid crystal molecule to obtain an initial liquid crystal composition,
disposing the initial liquid crystal composition between an array substrate and a counter substrate placed by cell assembly, and
connecting the polymer A and the polymer B in the initial liquid crystal composition to form the block copolymer, thereby forming the cholesteric liquid crystal composition.

15. The method of claim 14, wherein the initial liquid crystal molecule comprises a nematic liquid crystal molecule.

* * * * *